(12) United States Patent
Arashanipalai et al.

(10) Patent No.: US 11,169,506 B2
(45) Date of Patent: Nov. 9, 2021

(54) PREDICTIVE DATA CAPTURE WITH ADAPTIVE CONTROL

(71) Applicant: Cisco Technology, Inc., San Jose, CA (US)

(72) Inventors: Srinivasan Arashanipalai, Nashotah, WI (US); Chi Cao Minh, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 16/454,003

(22) Filed: Jun. 26, 2019

(65) Prior Publication Data

US 2020/0409339 A1 Dec. 31, 2020

(51) Int. Cl.
*G05B 19/4155* (2006.01)
*G06N 20/00* (2019.01)
*G06N 5/02* (2006.01)

(52) U.S. Cl.
CPC ........... *G05B 19/4155* (2013.01); *G06N 5/02* (2013.01); *G06N 20/00* (2019.01); *G05B 2219/33056* (2013.01)

(58) Field of Classification Search
None
See application file for complete search history.

(56) References Cited

U.S. PATENT DOCUMENTS

| | | | |
|---|---|---|---|
| 9,787,704 B2 | 10/2017 | Danielson et al. | |
| 10,474,723 B2 | 11/2019 | Hodge et al. | |
| 2006/0064486 A1 | 3/2006 | Baron et al. | |
| 2014/0051416 A1 | 2/2014 | Loborg et al. | |
| 2014/0122492 A1* | 5/2014 | Achtermann | G06F 16/355 707/737 |
| 2015/0324527 A1 | 11/2015 | Siegel et al. | |

(Continued)

FOREIGN PATENT DOCUMENTS

CN 105681298 A 6/2016

OTHER PUBLICATIONS

"Dynamic Monitoring Mode and Server Visibility", online: https://docs.appdynamics.com/display/PRO45/Dynamic+Monitoring+Mode+and+Server+Visibility, 2020, 2 pages, AppDynamics.

*Primary Examiner* — Charles E Anya
(74) *Attorney, Agent, or Firm* — Behmke Innovation Group LLC; James M. Behmke; Jonathon P. Western

(57) ABSTRACT

In one embodiment, a monitoring device ingests a plurality of data records sequentially from a data stream, each having an associated timestamp, and builds a cluster pattern for a plurality of time periods by placing each data record into a corresponding cluster of a particular time period based on the associated timestamp of each data record. The monitoring device then establishes connection between clusters of different time periods by assigning each data record of each particular time period to both an adjacent preceding and succeeding time period. The monitoring device may detect cluster transitions based on the established connections between clusters of different time periods, and can compute cluster migration metrics based on the cluster transitions. The monitoring device then predicts future cluster migration metrics based on computed cluster migration metrics, detects an anomaly about the predicted future cluster migration metrics, and reacts to the anomaly, accordingly.

20 Claims, 15 Drawing Sheets

(56) References Cited

U.S. PATENT DOCUMENTS

| | | | |
|---|---|---|---|
| 2017/0206464 A1* | 7/2017 | Clayton | G06N 3/0445 |
| 2017/0222901 A1* | 8/2017 | Jain | G06F 16/9537 |
| 2018/0337832 A1* | 11/2018 | Yamashita | H04L 41/145 |
| 2019/0080258 A1 | 3/2019 | Eder et al. | |
| 2019/0116193 A1 | 4/2019 | Wang et al. | |
| 2019/0158363 A1 | 5/2019 | Zhu et al. | |
| 2019/0163675 A1* | 5/2019 | Neels | G06F 16/242 |
| 2019/0205794 A1* | 7/2019 | Hsu | G06N 5/022 |
| 2019/0243836 A1 | 8/2019 | Nanda et al. | |
| 2019/0294524 A1* | 9/2019 | Gupta | G06F 11/302 |
| 2019/0294933 A1 | 9/2019 | Gupta et al. | |
| 2020/0007563 A1* | 1/2020 | Leibman | G06K 9/6247 |
| 2020/0082013 A1* | 3/2020 | Triplet | G06K 9/6219 |
| 2020/0174839 A1* | 6/2020 | Venkadasamy | G06F 11/3452 |
| 2020/0267057 A1* | 8/2020 | Garvey | H04L 41/0816 |

* cited by examiner

PREDICTIVE DATA CAPTURE WITH ADAPTIVE CONTROL

TECHNICAL FIELD

The present disclosure relates generally to computer systems, and, more particularly, to predictive data capture with adaptive control.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, the emergence of complex distributed applications spanning multiple data centers, new architecture patterns based on microservices and containers, and the growth of mobile applications have resulted in an exponential increase of data generated. Due to bandwidth, storage, latency, cost and privacy concerns, it is often impractical and unnecessary to send all the raw data ingested to a centralized location for processing. A significant portion of the data stored is never used as it may relate to normal behavior. In addition, as technology transitions to more autonomous systems, the ability to react to issues in near real-time becomes of utmost importance. This requires a rethinking of current approaches to data collection, storage, and analysis.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
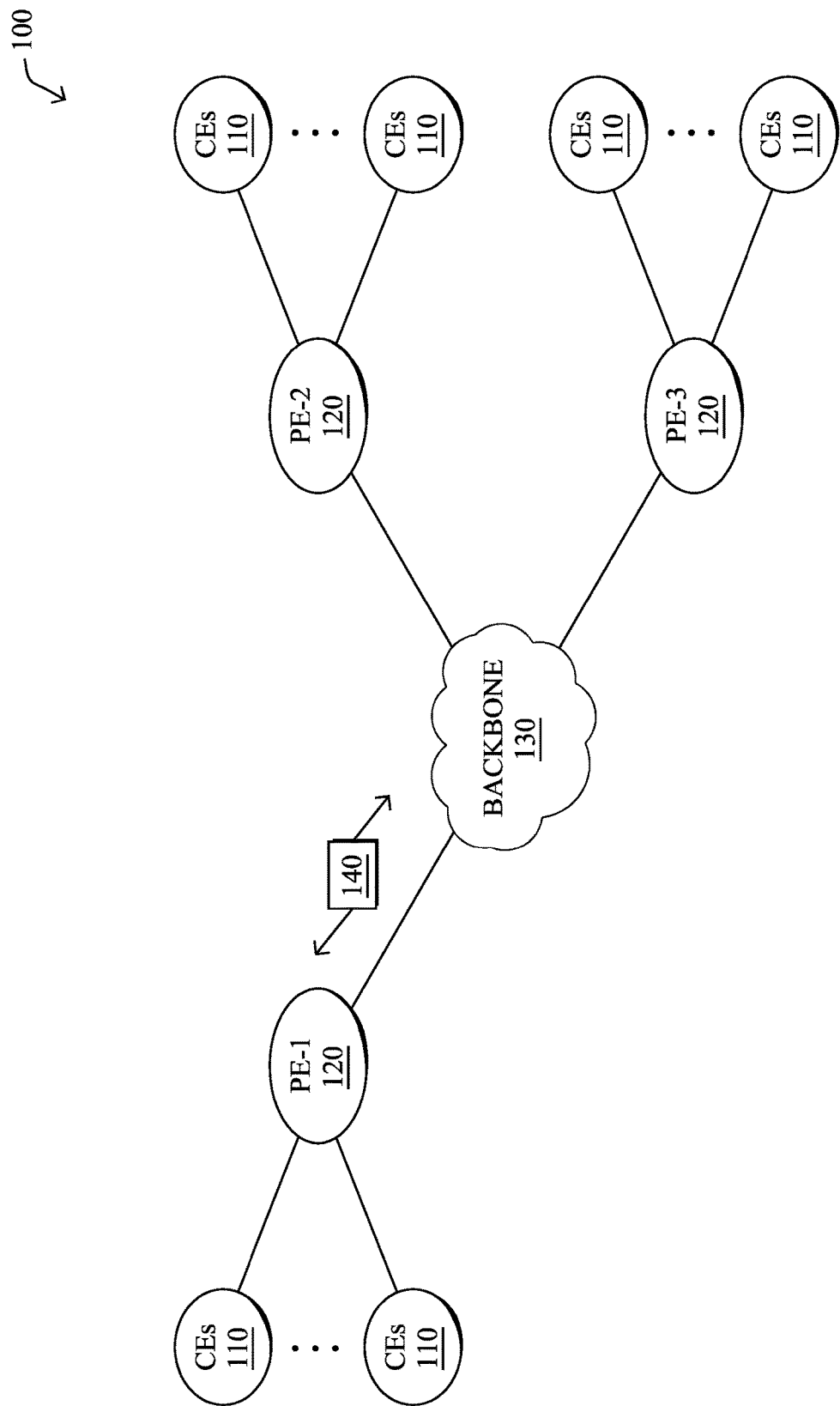
FIGS. 1A-1B illustrate an example computer network.

According to one or more embodiments of the disclosure, a monitoring device (e.g., edge device/agent) ingests a plurality of data records sequentially from a data stream, each of the plurality of data records having an associated timestamp, and builds a cluster pattern for a plurality of time periods by placing each data record of the plurality of data records into a corresponding cluster of a particular time period of the plurality of time periods based on the associated timestamp of each data record. The monitoring device may then establish connection between clusters of different time periods of the plurality of time periods by also assigning each data record of each particular time period to both an adjacent preceding time period and succeeding time period. As such, the monitoring device may detect one or more cluster transitions based on the established connections between clusters of different time periods, and can compute one or more cluster migration metrics based on the cluster transitions. The monitoring device then predicts future cluster migration metrics based on computed cluster migration metrics, detects an anomaly about the predicted future cluster migration metrics, and reacts to the anomaly, accordingly.

Other embodiments are described below, such as optionally including an identity of an upstream interaction of an interaction instance, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
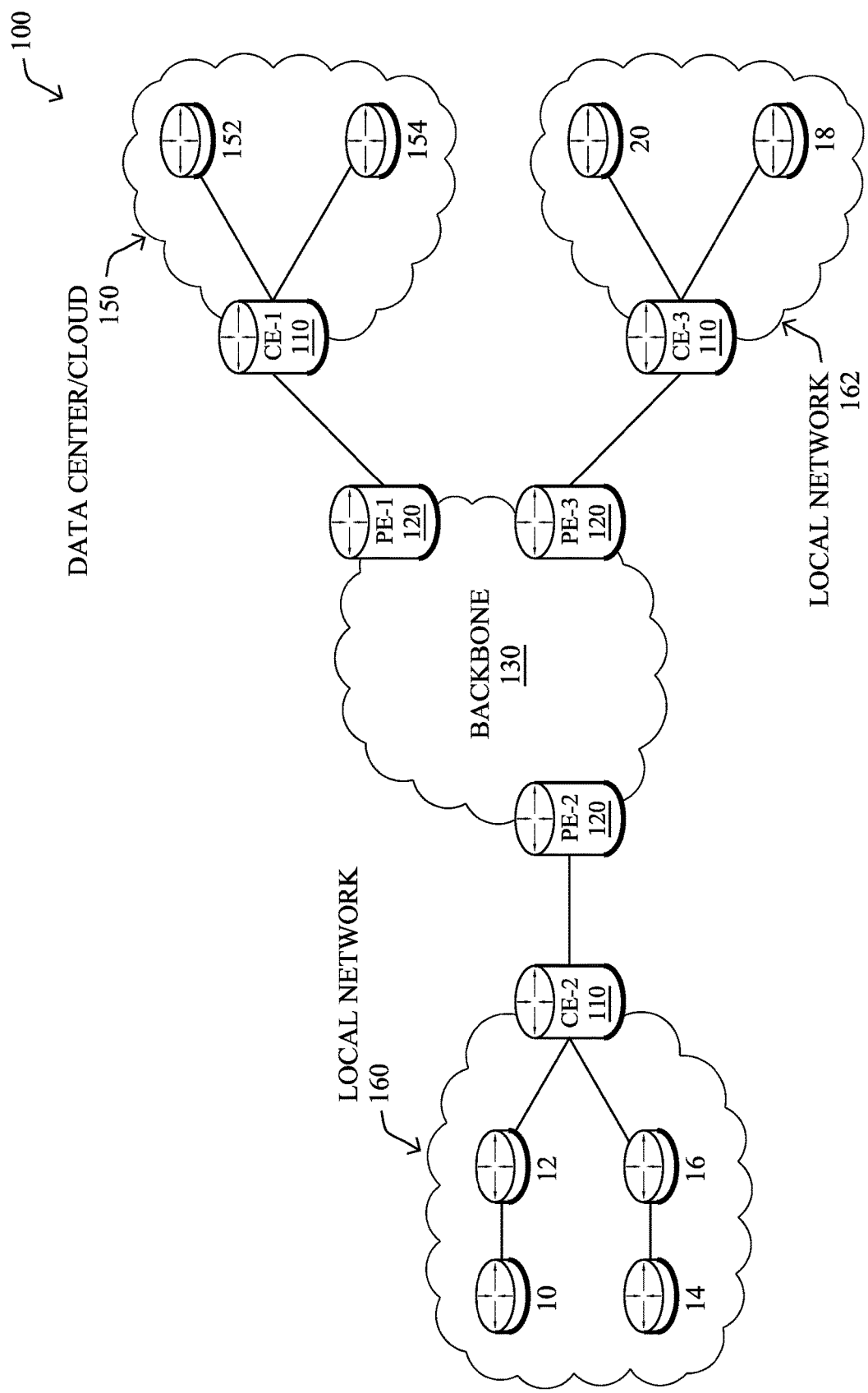

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
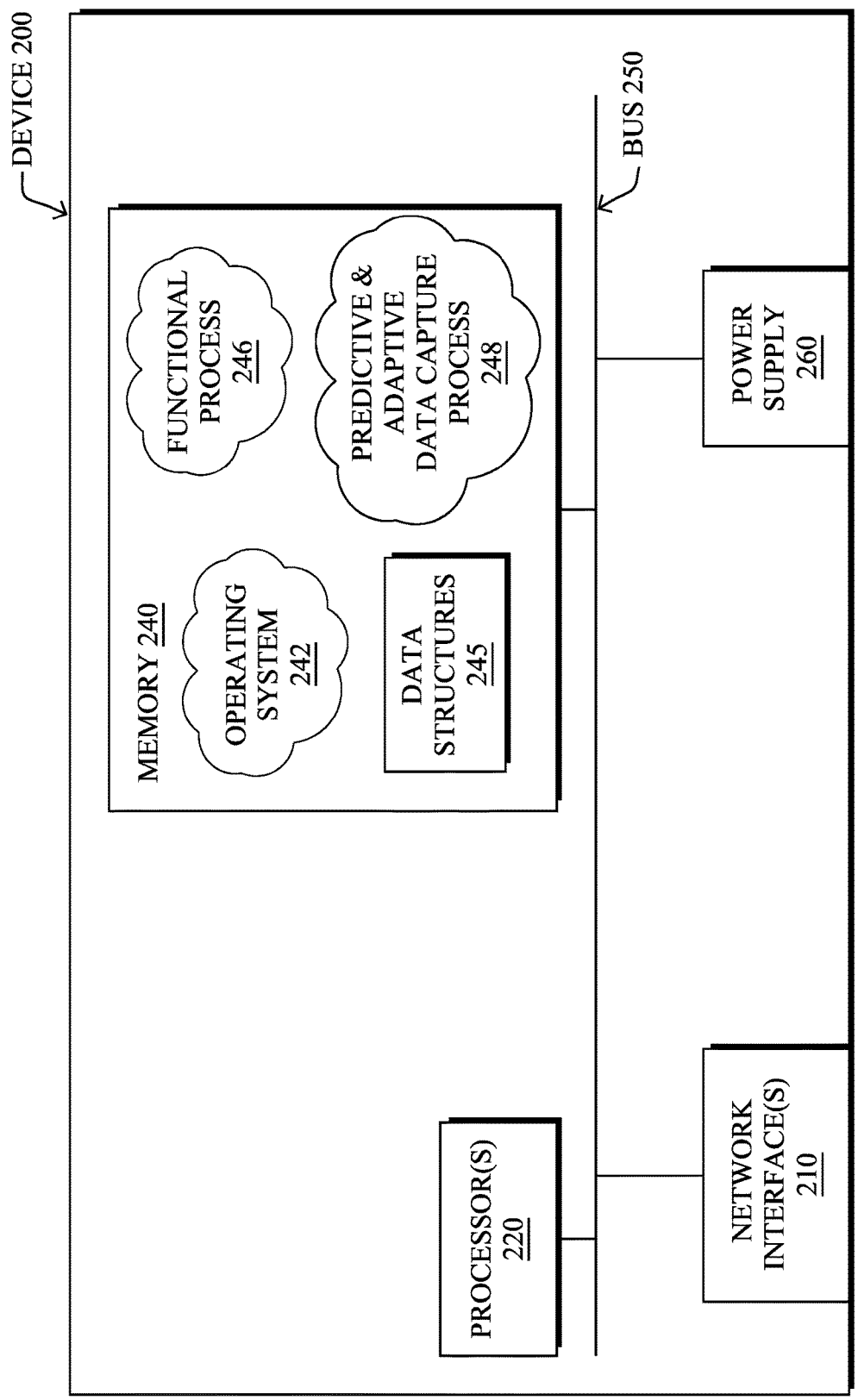
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "predictive and adaptive data capture" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Application Intelligence Platform——

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
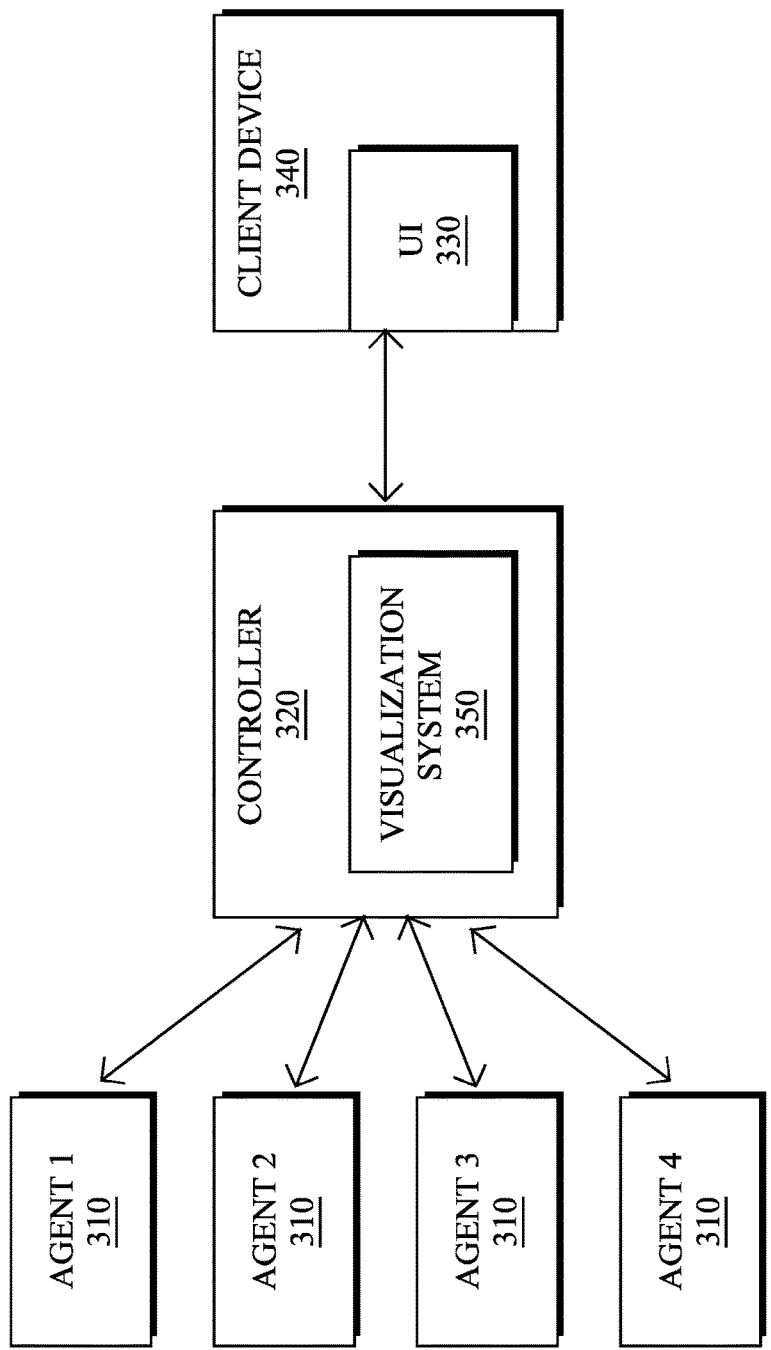
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
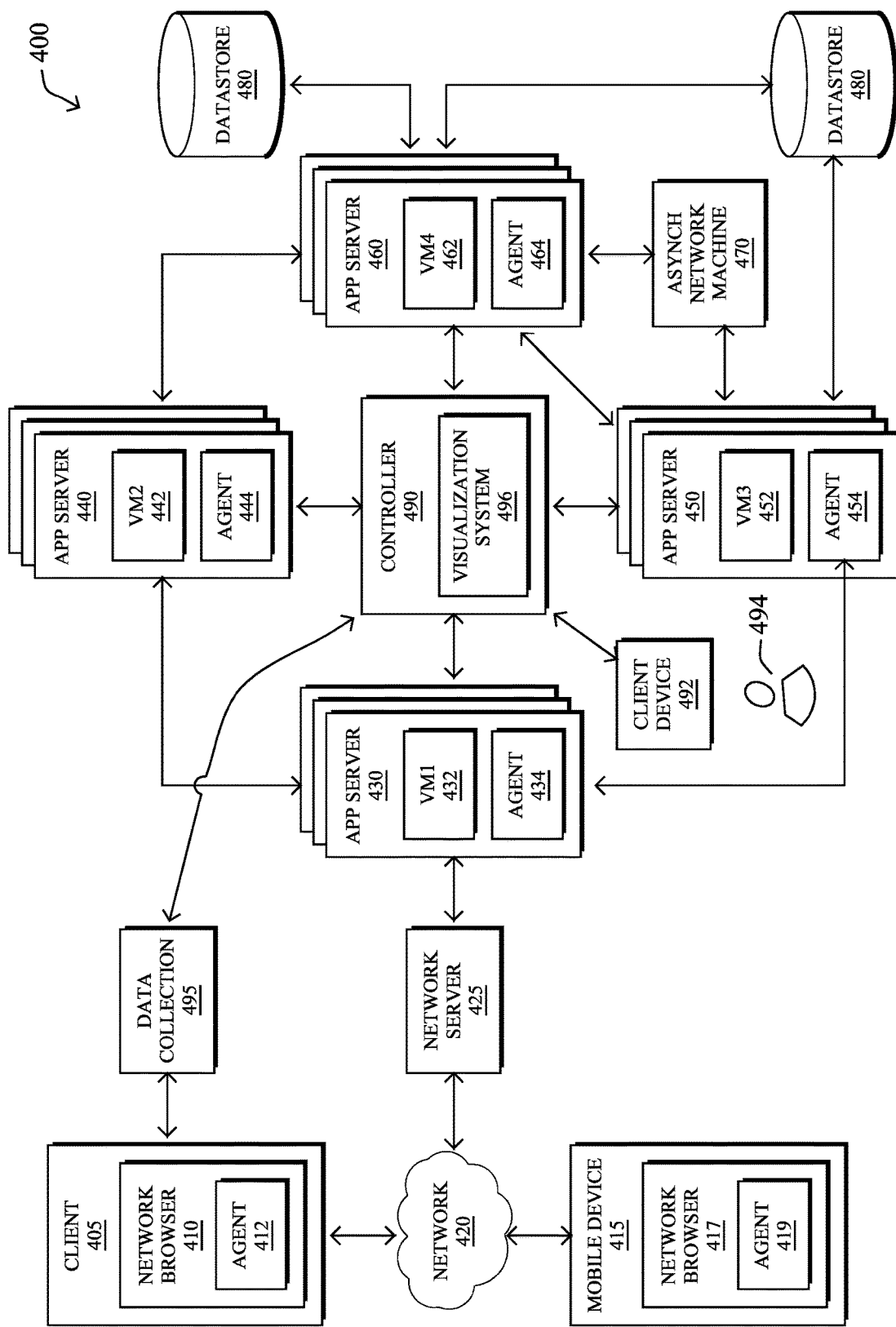
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 460, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 460 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 3). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 450. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 460. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 390 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
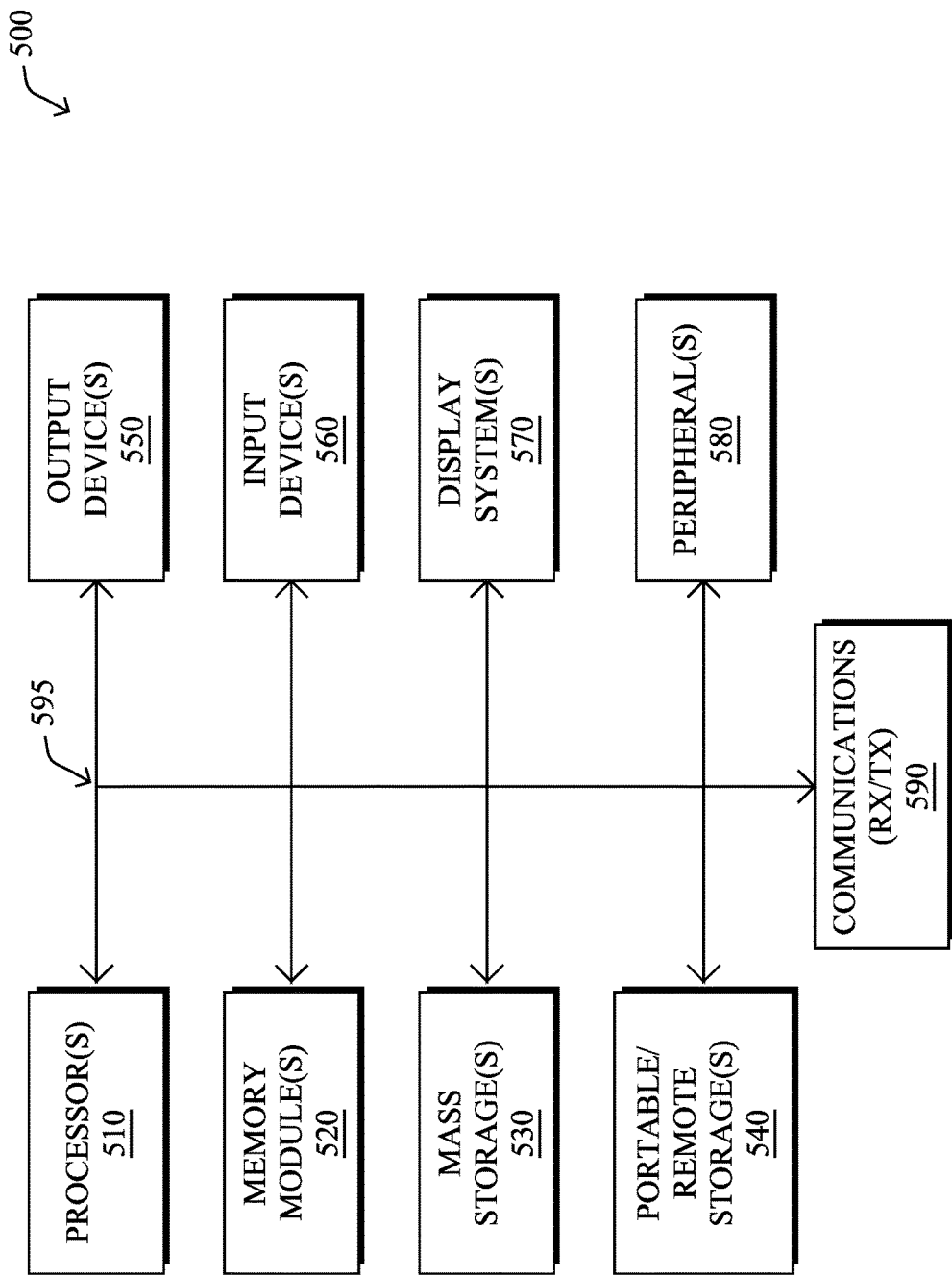
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, a synchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

——Predictive Data Capture with Adaptive Control——

As mentioned above, advances in technology have resulted in an exponential increase of generated data from monitoring systems. However, it is often impractical and unnecessary to send all the raw data ingested to a centralized location for processing, particularly as much of the data stored relates to normal behavior. In addition, reacting to the data or adjusting the data collection schemes in near real-time becomes more important as technology transitions to more autonomous systems.

For example, the application intelligence platform above, or any other application performance monitoring (APM) product, can obtain metrics about application and/or server performance. For instance, various agents can provide extended hardware metrics and service availability monitoring, providing additional information to enable administrators to see underlying infrastructure issues impacting application performance. This helps to troubleshoot hardware performance problems that are impacting applications, and to guide future application development. Also, Dynamic Monitoring Mode (DMM) is one particular feature that allows a user to selectively control the number and type of metrics reported by individual machine agents. This provides the flexibility to report key performance indicator (KPI) metrics only on most machines and then to (manually) increase the metric verbosity level on specific servers where deeper visibility is needed to diagnose problems. However, since this is a manual process, the risk is that there will either be too little data when a problem occurs, too much data when a problem isn't occurring, or else trying to manually change the collection rate whenever there is a problem will likely be too late to capture sufficient or relevant data.

Said differently, the agents send all the data (metrics and events) to a central controller for further processing, resulting in a significant of storage cost due to the explosion of data generated. In most cases, the data collected points to normal behavior and can be ignored (or a few normal samples would suffice). By having the agents report fewer metric by default, the storage costs are reduced and a given controller can effectively support more agents (there is a fixed limit on the total data ingestion rate for a given controller). However, requiring someone to manually increase the DMM level is not feasible for typical customer deployments of 100s to 10,000s of agents. That is, manually calibrating the granularity and volume of the data to captured based on health metrics extremely difficult and very time consuming. Moreover, by the time someone can manually increase the DMM level, the window of opportunity for capturing the relevant diagnostic data is likely gone.

Since diagnosing application or infrastructure performance issues requires a large breadth of data that: (1) often does not provide insight or add value (e.g., when performance issues are not occurring), (2) is expensive to store, and (3) is overwhelming for a user to understand what is the relevant data to analyze, the techniques herein provide predictive data capture with local and global adaptive control, particularly in a distributed transaction monitoring system as described above. In particular, the techniques herein apply a set of distributed machine learning (ML) techniques at the edge (e.g., agents, sensors, etc.) to be real-time, as well as a different set applied to a central data repository (e.g., controller, server, collector, etc.) so that behavior across domains (e.g., different servers or applications) can be understood and leveraged. The ML-based algorithms herein allow for adaptively minimizing the data collection to the relevant subset and to automatically invoke control actions (e.g., remediation actions). For example, in most cases, components such as hosts, VMs, containers, etc. are configured as homogenous units and their performance is expected to be similar. In such scenarios, the performance of a single unit is less important than the performance of a cluster of similar components. By tracking data at the cluster granularity, the volume of data to be analyzed is significantly reduced.

Specifically, according to one or more embodiments described herein, a monitoring device (e.g., edge device/agent) ingests a plurality of data records sequentially from a data stream, each of the plurality of data records having an associated timestamp, and builds a cluster pattern (or map) for a plurality of time periods (or windows) by placing each data record of the plurality of data records into a corresponding cluster of a particular time period of the plurality of time periods based on the associated timestamp of each data record. The monitoring device may then establish connection between clusters of different time periods of the plurality of time periods by also assigning each data record of each particular time period to both an adjacent preceding time period and succeeding time period. As such, the monitoring device may detect one or more cluster transitions based on the established connections between clusters of different time periods, and can compute one or more cluster migration metrics based on the cluster transitions. The monitoring device then predicts future cluster migration metrics based on computed cluster migration metrics, detects an anomaly about the predicted near term future cluster migration metrics, and reacts to the anomaly, accordingly.

Notably, the techniques herein may employ any number of machine learning techniques, such as to classify the collected data and to cluster the data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Figure 6:
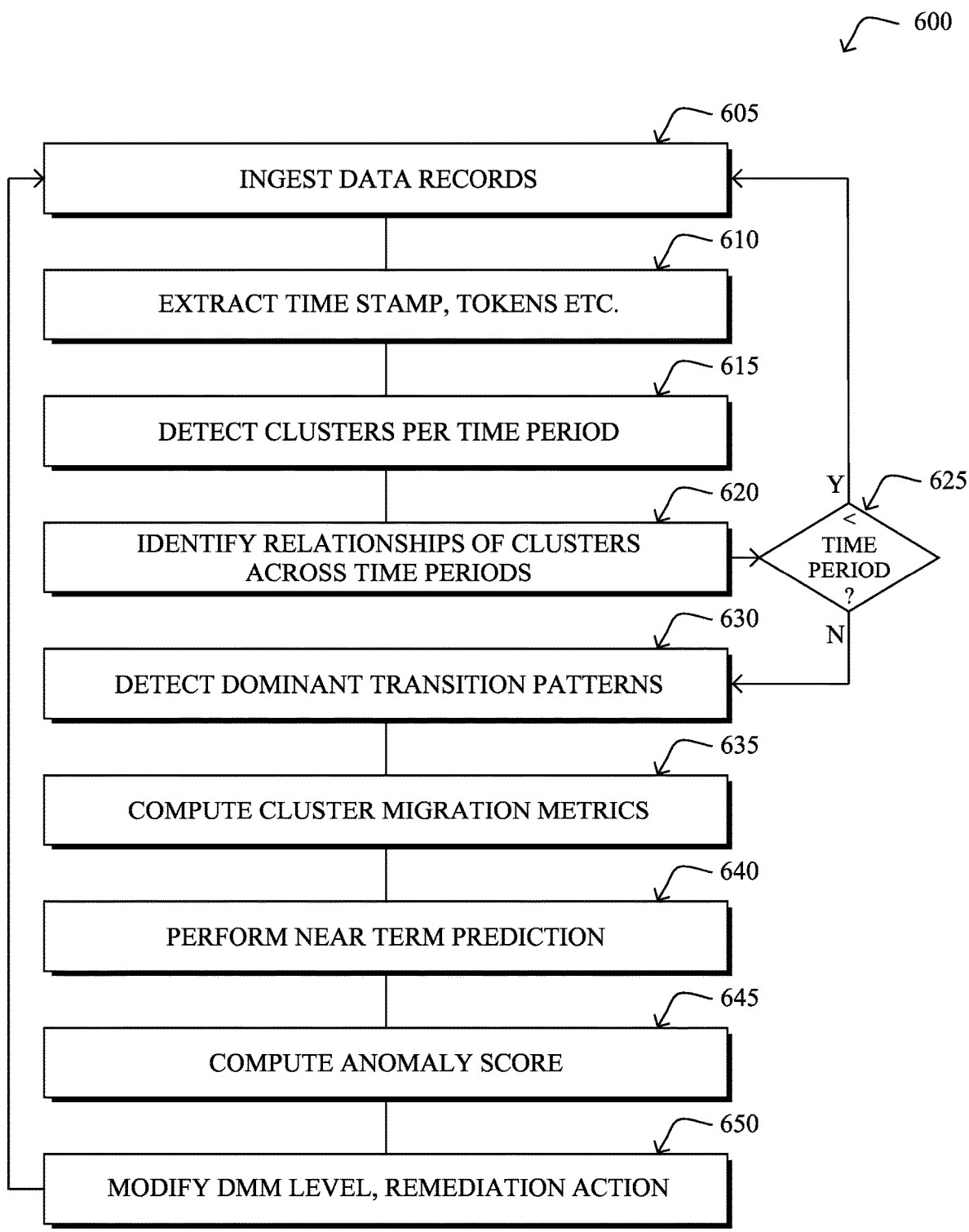
FIG. 6 illustrates an example of a high-level flowchart of a procedure for predictive data capture with adaptive control in accordance with one or more embodiments described herein.

Operationally, FIG. 6 illustrates an example high-level flowchart 600 demonstrating one or more embodiments of the techniques described in greater detail further below. In particular, in step 605 a monitoring device, such as an edge device (e.g., an agent, a sensor, an IoT device, etc.) or a backend device (e.g., a server, controller, etc.) ingests metrics and/or events, hereinafter referred to generally as "data records". The data are sequentially read from a stream of incoming data, and may be timestamped according to when the data records were created or ingested. In step 610, the techniques herein may then preprocess the data records, such as extracting the timestamps and optionally tokenizing the data. In particular, the techniques herein may be configured to tokenize and filter special characters, such as from strings or other non-numeric data records, in order to expedite clustering. (Notably, this step is more relevant for events than metrics.)

The embodiments herein are next directed to real-time cluster evolution analysis (CEA) and evolutionary clustering. In particular, in step 615, a static cluster pattern may then be iteratively built in step by adding each record to one of the existing clusters or generating a new cluster, if necessary. As described below, the data records are inserted into a cluster within a corresponding time period, though being in only one specific time period does not allow for a data record to be related to a cluster from a different time period. Additionally, therefore, according to the techniques herein, an evolutionary clustering model is established that is able to connect data record clusters from a sequence of static cluster pattern, thus enabling the detection of transitions between these clusters. Specifically, in step 620, the techniques herein allocate records into cluster patterns where this temporal connection is established between clusters by assigning (or allocating) the data records in the static cluster patterns of both the adjacent prior (or preceding) and succeeding (or subsequent) time periods.

This process is performed for each time period (step 625), and once more than one time period exists with corresponding clusters, then in step 630 the techniques herein may now detect cluster transitions. In particular, the techniques herein can identify which cluster from the current cluster pattern resulted from which other cluster from a prior cluster pattern. Transitions such as splits or merges between clusters are detected. That is, that the techniques herein perform cluster "dynamic migration pattern detection", which includes external changes in changes in cluster characteristics and between cluster migration of cluster members (data records/objects), such as splits, absorption, etc., and also includes internal changes, such as cluster size, density, etc.

Now, in step 635, the techniques may begin to compute cluster migration metrics. For instance, based on the transitions between correlated clusters, migration metrics that measure the state of the cluster pattern and relate to changes of specific clusters are computed. For example, an evolution metric may indicate if a cluster is stable by comparing whether the records allocated to a cluster in a time period were also allocated to the same cluster in prior time period. These cluster migration metrics may be used to track cluster trajectories, which in step 640 allows for near term cluster migration prediction. Specifically, the cluster metrics form time-series are approximated and may be associated with appropriate machine learning models that take near term trends into account. Seasonal effects are detected in the backend longer term clustering model and is made available to the edge models. An extrapolation of these models may be used to produce a near term forecast for the metric in a subsequent time period. Said differently, the techniques herein may prepare for its online anomaly detection by classifying the relevant metrics as time-series and employing near term prediction models in order to detect deviations from expected behavior.

In step 645, in particular, the techniques herein may detect such anomalies, by using the prediction computed in the preceding time period, where the system detects an anomaly if this value exceeds a threshold (e.g., beyond a manually configured or determined threshold) from the actual measured metric (e.g., a percentage, a distance, a rate of change, and so on). In this manner, changes of the system behavior are recognized as quickly as possible, while the algorithm is at the same time able to incorporate, without manual intervention, these changes already in the following prediction. The embodiments herein may illustratively include one or more different anomaly detection methods, and may specifically provide for contextual anomalies, e.g., detecting data records that do not align to previously gained knowledge about their behavior. This overcomes the limitations of static clustering approaches that detect dissimilar data records which occur only once (or a few times) in a time period as outliers rather than temporal anomalies which are detected as system behavior changes over time.

Note that the techniques herein may also find correlations between data records, such as by monitoring the correlations between the time-series corresponding to the cluster developments. Groups of correlating time-series are incrementally built in every time step.) That is, correlation, in this sense, checks whether occurrences/frequencies of some of the data records correlate over time, which indicates that the time-series of the retrieved cluster sizes also correlate with each other.

Lastly, according to the techniques herein, in step 650 the DMM level may be modified (that is, the data collection rate, specificity, verbosity, etc. may be adjusted) and/or various anomaly remediation/mitigation actions may be taken. Either of these reactions to a detected anomaly may be configured in advance or may be dynamically chosen (and illustratively at different levels, such as based on an anomaly "score" that defines the appropriate level of response).

The example flowchart 600 may then continue to collect data records and perform the clustering described above, as more time periods are reached through the passage of time, allowing for continued real-time predictive anomaly detection and adaptive control, accordingly.

In greater detail, a key component of the present disclosure is "smart agents" that include a machine learning (ML) algorithm to trigger control actions (e.g., dynamic monitoring mode (DMM) data capture). As noted above, the algorithm applies evolutionary clustering to streaming data. Since storing the data is infeasible for large data sets, a "light compute footprint" approach divides the clustering process into two components to optimize storage and memory utilization:

Edge (e.g., agent) Near Real Time-clustering (e.g., online): Uses minimal summary statistics of data to monitor cluster migration. Is done in near real time but is restricted to local data;

Backend (e.g., controller) Long Term-clustering (e.g., offline): Data is stored at different levels of granularity. Consists of data across domains (e.g., APM, NW etc.) but is not done in real-time.

This approach allows exploration of the migration of the clusters over longer time periods and across domains (different servers, applications, etc.) at the backend, while analysis and response (i.e., control action) possibilities in real-time at the edge.

Figure 7:
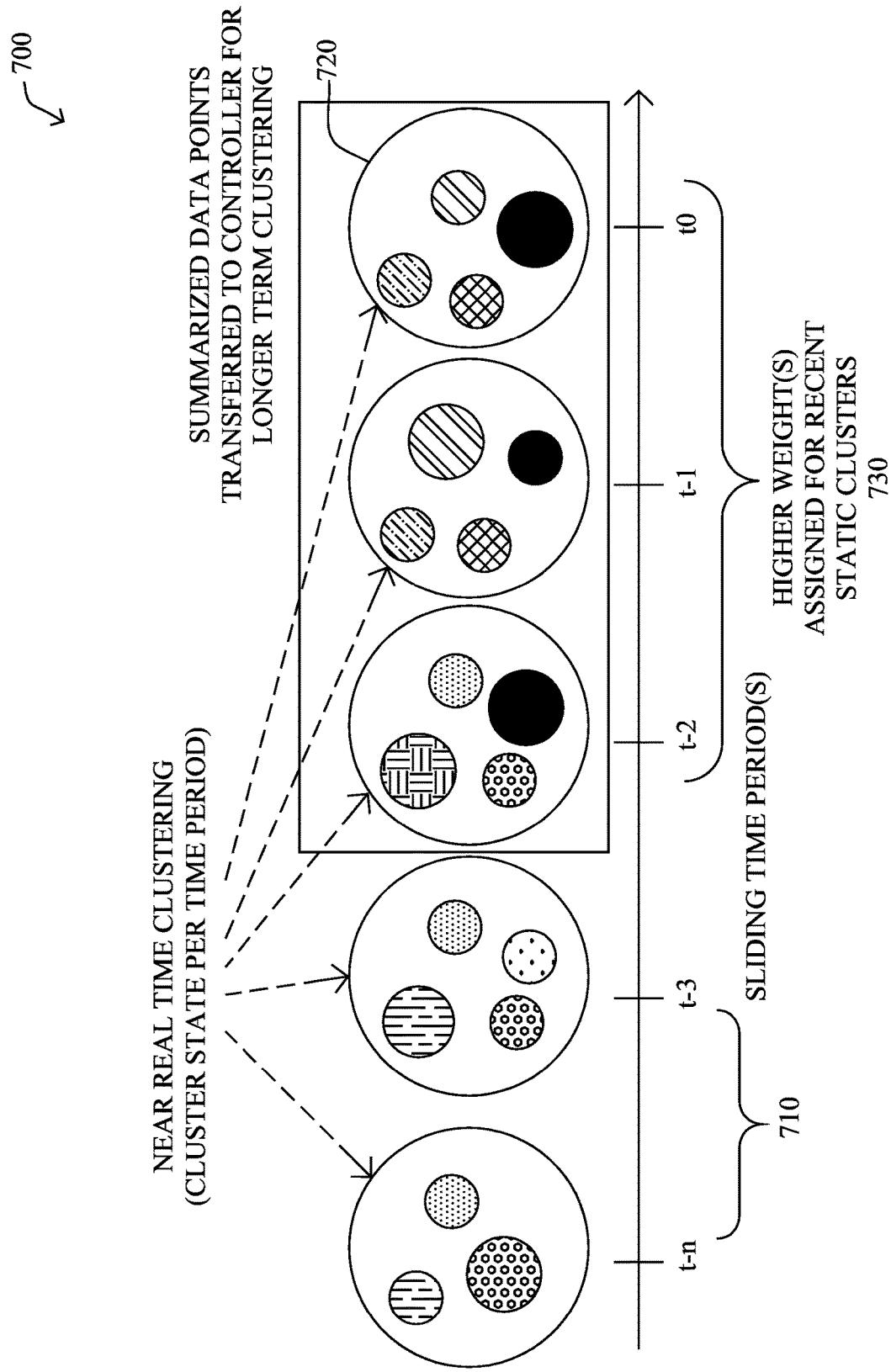
FIG. 7 illustrates an example diagram on how the techniques herein can optimize memory utilization at the edge in accordance with one or more embodiments described herein.

In particular, FIG. 7 illustrates an example diagram 700 on how the techniques herein can optimize memory utilization at the edge. For instance, while storing all the data points at the edge will lead to high memory requirements (i.e., infeasible or, in the least, impractical). The online phase takes periods of time 710 (bounded by time boundaries "t", e.g., 1-3 minute time intervals, or any configured and suitable time interval for the given domain) and creates the cluster patterns 720 to send as a "Cluster State" 730 to the servers/controllers. The online phase thus satisfies a "one-pass" constraint at the edge, while dynamically identifying a number of "Cluster State(s)" to be maintained at the edge/backend (e.g., twenty time periods' worth of clusters at the edge, days, or weeks at the backend). In this manner, the longer term clustering phase contains only the summary statistics being stored in the controller from the snapshots and not the actual dataset itself, while still supporting cross-domain correlation between the clusters.

Said differently, the techniques herein thus only require a very small amount of relevant data (e.g., ~10%) to be transferred from the edge to the backend (controller), which substantially reduces the storage and related costs. That is, as mentioned above, the data set transferred to the backend (controller) is used by the cluster migration algorithms to detect cross-domain anomalies and long-term trends, and thus only a few data records of interest (typically anomalies and few normal events) need to be sent to the controller for cross domain correlation (CDC). As described herein, the results of the CDC may then be "pushed" back to the edge for actioning (e.g., DMM adjustment, anomaly detection and mitigation guidance, etc.).

Notably, the machine learning algorithms used herein provide a number of novel features that assist the functionality of the embodiments herein. For instance, the techniques herein use incremental clustering on streaming data to support high performance and efficient memory usage that scales linearly with the data ingest rate. This results in a very small footprint at the edge (agent), and is very different from classical clustering approaches in which all the clusters are recalculated for every new data point (i.e., which are memory and computationally intensive). In addition, the machine learning may further define the appropriate length of the time periods, the appropriate amount of data to capture, and so on.

Moreover, there is a significant diversity in how data streams are structured depending on the type of application, configuration defining the type of events, etc. For example, there are typically two types of data record to collect: events (e.g., non-numeric, textual information); and metrics (e.g., numeric and structured). The techniques herein thus tokenize event data or other strings or non-structured formats prior to applying clustering algorithms, in order to track all types of data record. Further, the structure of the data stream is dynamic and can change frequently. The techniques herein do not require the creation of templates for each new data stream due to system modifications or configuration changes to enable pattern matching, but instead use flexible distance metrics that adapt to changes in data stream structure. In this manner, the algorithm is agnostic, using tokenized character-based distance measurements.

Regarding automated anomaly detection herein, classic static cluster patterns provide a static view of the data and highlight outliers based on presence/absence of significant words. This classic approach, however, is inadequate for the techniques herein. As such, in accordance with one or more embodiments described herein, anomaly detection is based on cluster migration that detects dynamic relationships and correlations across time periods to accurately detect anomalies and trends. In other words, rather than simply watching for a threshold violation in a value, the techniques herein predict forward some length of time (e.g., 120 seconds, 180 seconds, etc.) and determines not only if that prediction is within an acceptable range, but also whether the results of data records at that time in the future are vastly off-base from the predictions. This way, there need be no baseline value to determine or detect, allowing the techniques herein to account for changes in trends. In particular, a comprehensive set of cluster migration metrics may be computed that reflect different types of cluster transitions and can be adapted for specific use case requirements based on the best fit. A user does not have to manually set up and maintain multiple static thresholds which can be difficult and cumbersome. The self-learning ML model instead uses near term prediction models to automatically detect anomalies.

Figure 8:
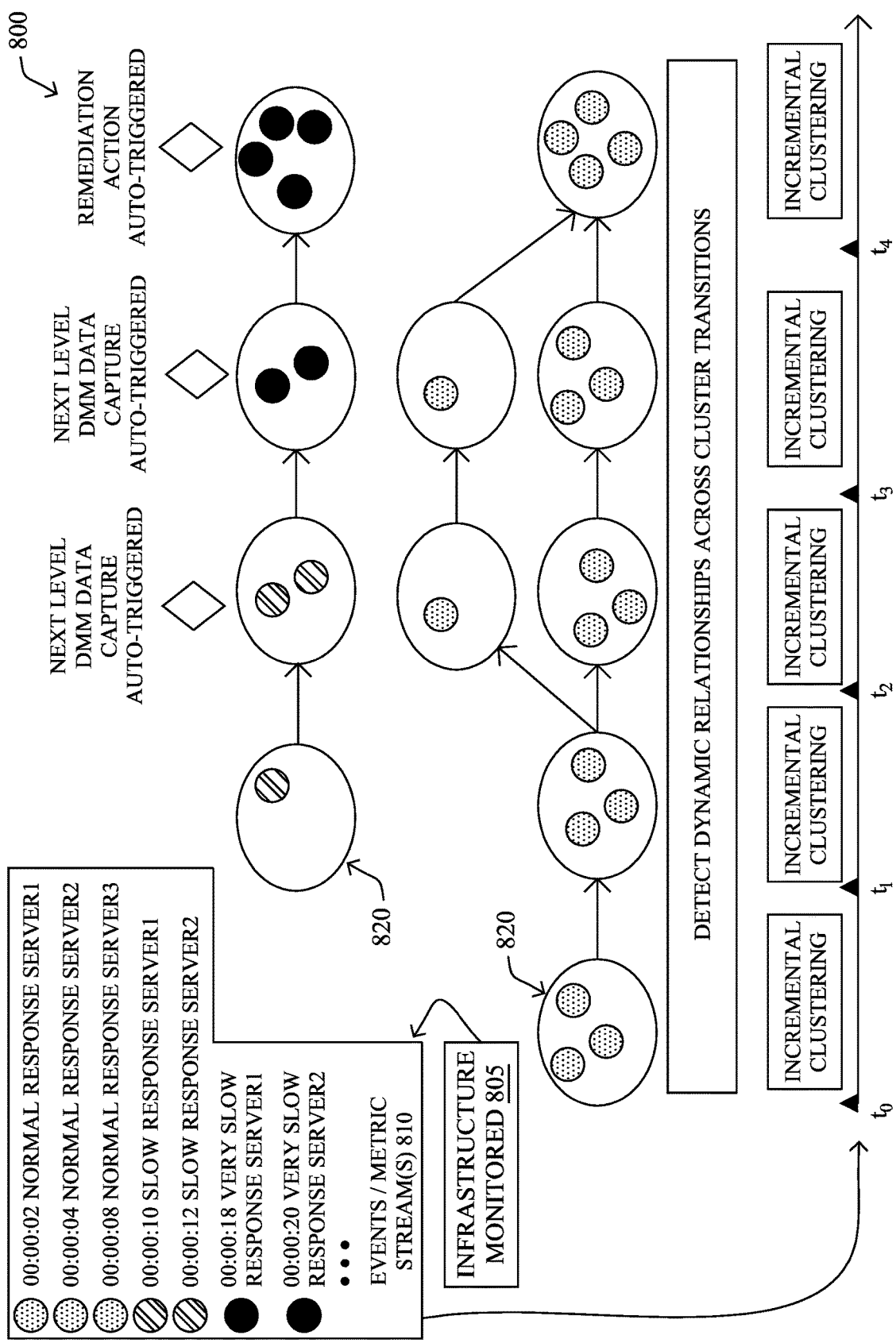
FIG. 8 illustrates an example visual representation for predictive data capture with local adaptive control flow using machine learning in accordance with one or more embodiments described herein.

FIG. 8 illustrates an example visual representation 800 for predictive data capture with local adaptive control flow using machine learning according to one or more embodiments herein. In particular, an infrastructure 805 to be monitored illustratively produces events/metric streams 810 as shown, such as several normal, slow, and very slow server response times with different timestamps (any entity or metric may be used, and those shown are merely for discussion of the example). By first ingesting the events of the device(s) through a time series (i.e., in sequential manner with timestamps), the techniques can tokenize the events and may determine how to classify/cluster the data records into corresponding clusters. In particular, through incremental clustering within time periods between time boundaries $t_0$, $t_1$, $t_2$, etc. (e.g., based on the device, dynamically determined, more data within time periods, shorter time periods, etc.), the techniques herein can establish one or more clusters 820 (e.g., as shown, normal, slow, and very slow clusters), and can then detect dynamic relationships across cluster transitions. For instance, by creating the cluster pattern (i.e., a "picture" of clusters at a given time), by then predicting the next state of migration of the clusters and seeing a change (e.g., a new cluster being born/established), whether that change is merely predicted (in advance of a problem) or the change is contrary to what was predicted (e.g., predicting no new clusters and then discovering a new cluster), then such anomalous changes may trigger changes to the DMM (e.g., data verbosity, frequency, etc.), as well as one or more remediating actions (e.g., alerts, reports, redirections, load balancing, shut downs, restarts, etc., based on the domain of the data records). Anomaly detection itself may be based specifically on contextual anomalies (e.g., for a specific cluster identify data points that are anomalous with respect to the most recent values), aggregated detection (e.g., compute an anomaly score to aggregate the anomalies that occur in each time step—not all clusters should be equally weighted when considering the anomalies that are detected in their developments), or through correlation (e.g., used to measure the relatedness of variables—can be applied to time-series rather than variables and is represented by the cross-correlation function). Note that the reaction taken on the edge device may match the severity of the anomalies detected, that is, the relevant control action is automatically triggered to capture additional diagnostic data or to resolve issues (e.g., remediation actions) based correspondingly to a perceived level and urgency of the anomaly.

Specifically, according to one or more features of the techniques herein, adaptive control for localized root cause analysis (RCA) may be achieved by automatically triggering the DMM action and enabling local corrective actions to remediate the issue, as mentioned above. Based on an anomaly score, the DMM metric level data is set to the next level automatically to gather addition metric detail (e.g., KPI to Diagnostic mode). The cluster migration and anomaly score may then be computed for the new metric detail level (e.g., diagnostic mode). If the anomaly score exceeds the predicted value, the next level data capture is triggered (e.g., diagnostic mode adjusted to an advanced diagnostic mode). The cluster migration and anomaly score may be tracked at this new level. If the anomaly score drops below the threshold (e.g., for multiple time-periods), the DMM data capture level may be reset to a lower level. If the anomaly score exceeds a certain threshold, a corrective action could be enabled (e.g., restarting the server/VM).

Note that part of the intelligence of the techniques herein is to use contextual knowledge. That is, in order to minimize false positives and improve the accuracy of the models, domain-specific heuristics may be used as part of the ML algorithms (e.g., minimum CPM, time period durations to trigger additional diagnostic data (DMM), action to be taken related to the entity being monitored, etc.). These rules may be defined and maintained centrally and pushed to the agents.

Figure 9:
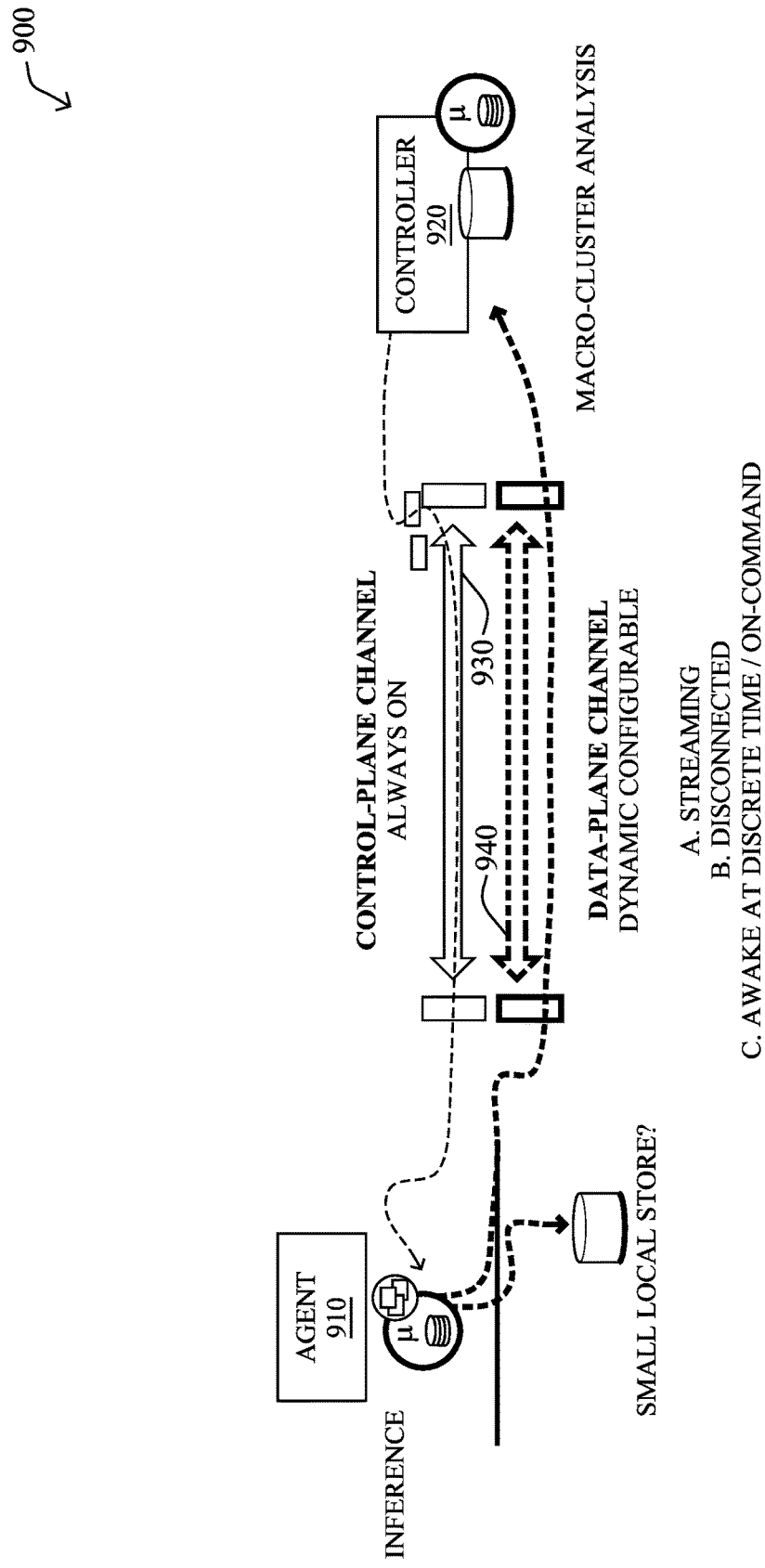
FIG. 9 illustrates an example of edge devices being connected to a backend device through various control-plane channels and data-plane channels in accordance with one or more embodiments described herein.

In particular, according to the embodiments herein, the edge devices specifically (e.g., the agents on the edge devices) perform action locally as part of a distributed machine learning/actioning component of the overall system, in coordination with the centralized controller(s). FIG. 9 illustrates a simplified example 900 of one (of one or more) edge devices (e.g., agent 910) connected to a backend device (e.g., controller 920) through various control-plane channels 930 (e.g., always on) and data-plane channels 940 (e.g., streaming, disconnected, or awakened at discrete times/on-command). In particular, the agent(s) 910 (which may or may not have its own local storage) performs the real-time cluster migration analysis, which includes such actions as data collection, parsing, filtering, classification, and categorization, and then anomaly detection and actioning, as described above. Conversely, the controller 920 performs the macro-cluster analysis as described herein, such as the cross domain correlation involving the creating of a new knowledge via supervised and semi-supervised machine learning (e.g., and deep learning, as may be appreciated by those skilled in the art). The controller is thus tasked with detecting patterns, making rules, generating models and profiles, and so on. (A note on model building: To begin, the models may be built and tested using historical data maintained in the controller. This enables fine tuning of the features, time periods, etc. After the models are created, they may be tested using a representative historical data set on the controller. The models and heuristics are then pushed to the agent to enable local action.)

Figure 10:
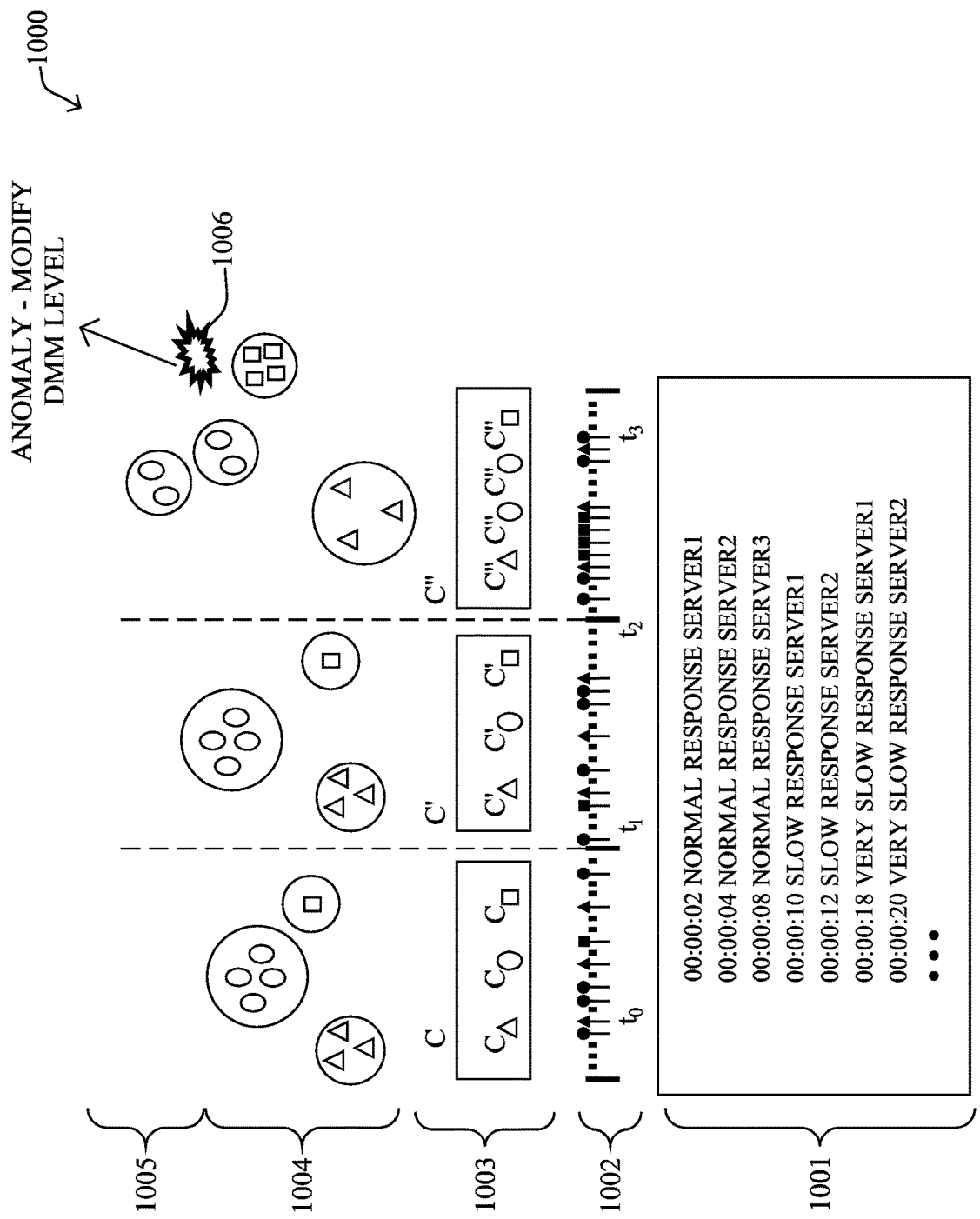
FIG. 10 illustrates an example of clustering and anomaly detection in accordance with one or more embodiments described herein.
Figure 11:
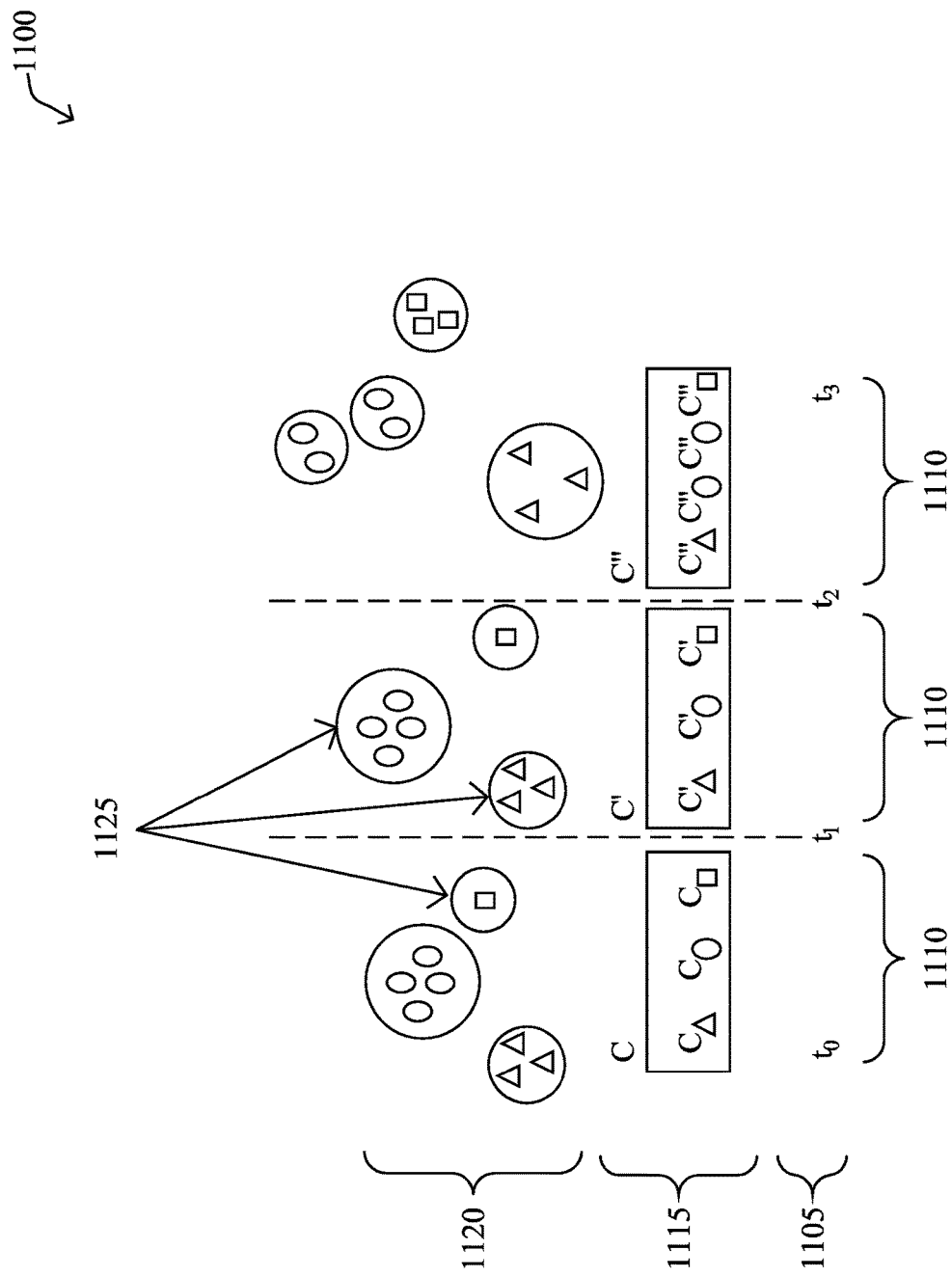
FIG. 11 illustrates an example of interpreting cluster relationships in accordance with one or more embodiments described herein.
Figure 12:
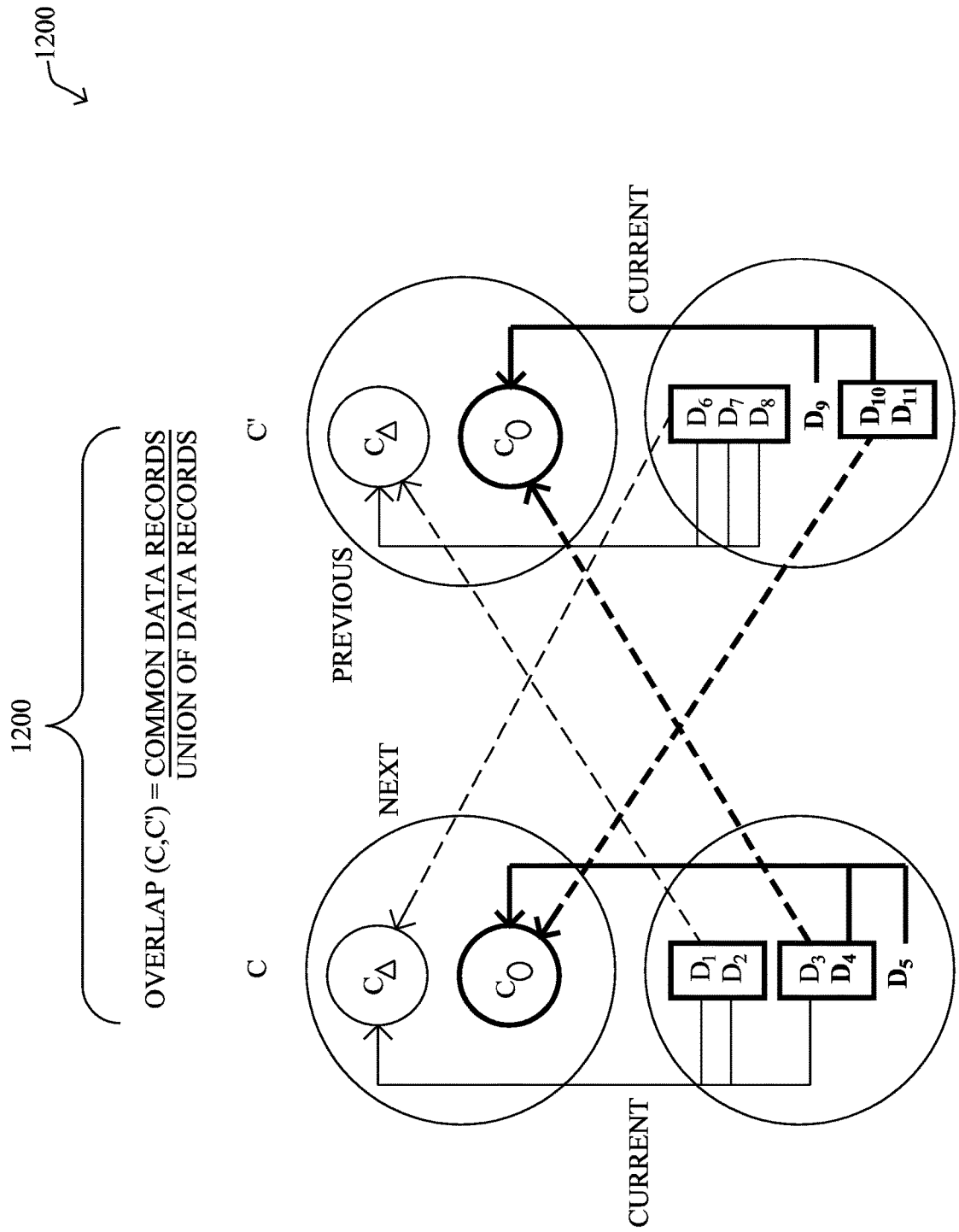
FIG. 12 illustrates an example of cluster correlation in accordance with one or more embodiments described herein.

FIGS. 10-12 illustrate further details and examples on clustering and anomaly detection. FIG. 10, in particular, illustrates an example 1000 of clustering and anomaly detection in accordance with one or more embodiments described herein, where the concept of migration metrics is more fully detailed. In particular, cluster migration metrics are like a 2-3 step forward approach, where since monitored entities are generally configured to function in the same manner, such that the behavior of a cluster becomes more important to monitor than individual device/application behavior.

Section 1001 illustrates the collection of an event stream as the data records, similar to that shown above. Then, in section 1002, events occurring within time period are identified (i.e., data records with timestamps within certain time periods), such that in 1003, the creation phase, the techniques herein can iteratively build cluster patterns for every time period (e.g., using unsupervised machine learning such as K-means, DBSCAN etc.), such as cluster patterns C, C', and C'', with corresponding clusters $C_{\_triangle}$, $C_{\_circle}$, and $C_{\_square}$. Now, as mentioned above and as detailed further below, in 1004, the assignment phase, the techniques herein establish connection by assigning the events (data records) in the cluster patterns of the preceding and succeeding time periods. As further described herein, in section 1005, the techniques herein may thus predict cluster migration metrics and detect and react to anomalies (e.g., unsupervised machine learning), such as anomaly 1006 (e.g., modifying the DMM level in response).

In greater detail, and with reference to FIG. 11 illustrating an example 1100 of cluster relationships that may be interpreted, assume that $t_0$, $t_1$, $t_2$, and $t_3$ represent the boundaries 1105 of the time periods 1110 of each cluster pattern 1115. The techniques herein clusters (into cluster 1120) the data records 1125 according to a clustering algorithm and string similarity metric (e.g., Jaro-Winler, Levenshtein, etc., as will be understood by those skilled in the art). This results in the three cluster patterns C, C', and C'' from three different time periods. Without cluster migration pattern detection it would not be possible to determine how the formation of those four clusters was accomplished or how any of the clusters from different time periods relate to each other. However, according to the techniques herein, not only is it possible to track the clusters over all time steps, it can be seen that cluster $C_{\_circle}$ splits up in the last time period (cluster pattern C''). Also, cluster $C_{\_triangle}$ increases its distance to the other clusters in C' and further becomes more diffuse in C'' which is represented by the diameter of the circle. $C_{\_square}$, which represented an outlier in C and C'', i.e., the data record could not be allocated to any other group of messages and thus remained alone in its own cluster, increased its size in C''.

In addition, FIG. 12 illustrates an example 1200 of cluster correlation in accordance with one or more embodiments described herein. In particular, two clusters are considered similar if the majority of the elements contained in C' would have been allocated to cluster C if they had been used for the generation of cluster pattern C. One option, as illustrated, is to use a Jaccard (or Dice) coefficient 1330 for binary sets which measures the ratio of common data points in order to determine the overlap between two clusters, as may be appreciated by those skilled in the art.

According to one or more embodiments described herein, cluster transitions and migration patterns may be based on a number of different types of cluster "changes" and corresponding migration metrics can be deemed therefrom. For instance, compositions of clusters are frequently subject to change and similar clusters generated in the same time periods may be the result of splits or may result in a merge, or other actions. For instance, external changes may include, among others:

Preservation—A cluster C persists and transforms into C' if overlap (C, C')>threshold value;

Splits—A cluster C splits into the into individual clusters $C_1, C_2 \ldots C_n$ if all individual parts share a minimum amount of similar data records with the original cluster;

Absorbed—The group of clusters $C_1, C_2 \ldots C_n$ merge into cluster C if all individual parts share a minimum amount of similarity with the resulting cluster (i.e., absorption);

Death—Disappearance of a cluster that did exist no longer exists; and

Birth—Emergence of a cluster that did not exist now exists.

Various internal cluster changes may also occur, such as, for example:

Size—The cluster grows in size if C' contains more data points than C, shrinks if C' contains less data points than C and does not change in size otherwise; and Density—Measures compactness of the cluster.

Additionally, various cluster transition/migration metrics may be computed, tracked, and compared according to the techniques herein, and may be specifically adapted based on use case. For example, some example migration metrics may include:

Growth rate: Measures the absolute difference between the cluster member sizes of across two consecutive time periods;

Change rate: Measures the relative difference between the cluster allocations of the data records from a prior time period with respect to the total number of data records that were processed in the corresponding time period;

Novelty rate: Measures the fraction of newly appeared members between two consecutive time periods; and Split rate: Measures the fraction of cluster members that were split between two consecutive time periods.

Figure 13A:
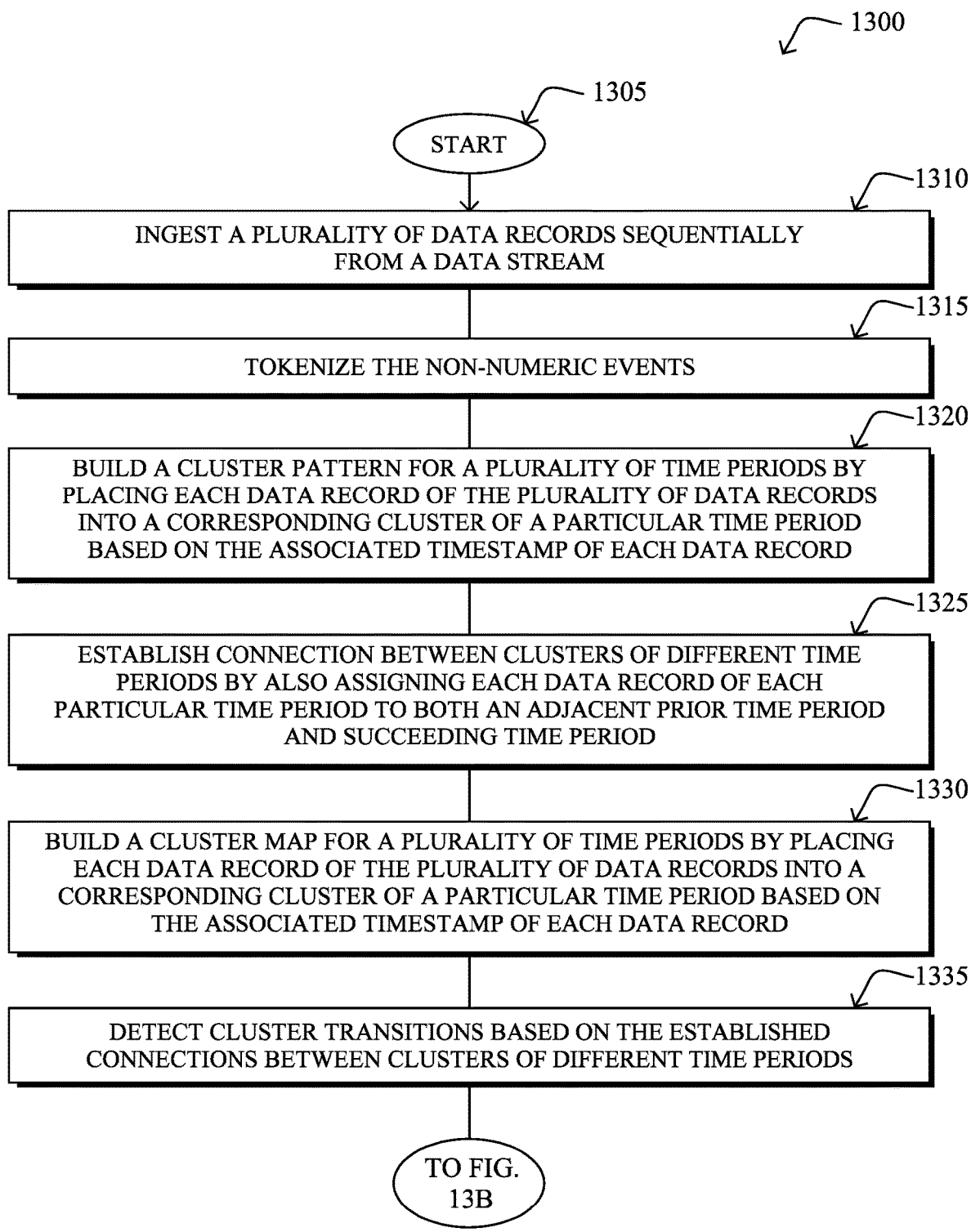
FIGS. 13A-13B illustrate an example simplified procedure for predictive data capture with adaptive control in accordance with one or more embodiments described herein.
Figure 13B:
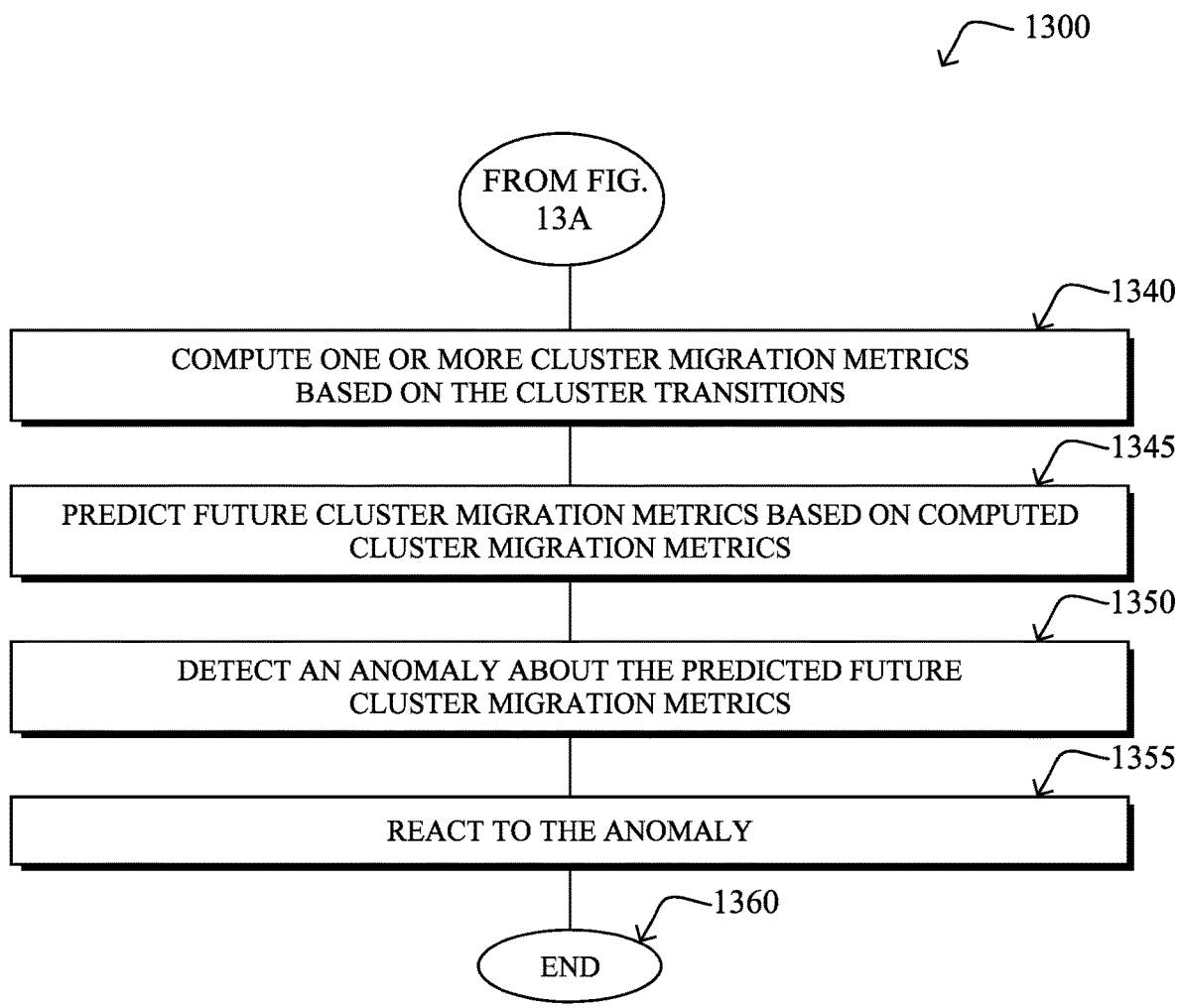

In closing, FIGS. 13A-13B illustrate an example simplified procedure for predictive data capture with adaptive control in accordance with one or more embodiments described herein, particularly from the perspective of either an edge device or a controller. For example, a non-generic, specifically configured device (e.g., device 200, particularly a monitoring device) may perform procedure 1300 by executing stored instructions (e.g., process 248, such as a monitoring process). The procedure 1300 may start at step 1305, and continues to step 1310, where, as described in greater detail above, a monitoring device ingests a plurality of data records sequentially from a data stream, each of the plurality of data records having an associated timestamp. Note that the monitoring device may generally be an edge device (e.g., agent), and the data records comprise local data. However, in one embodiment, the monitoring device is a controller, and thus the data records may comprise cross-domain cluster data, as noted above.

In step 1315, especially where the data records comprise one or both of numeric metrics and non-numeric events, the techniques here may tokenizes the non-numeric events prior to clustering the data below.

In step 1320, the monitoring device builds a cluster pattern for a plurality of time periods by placing each data record of the plurality of data records into a corresponding cluster of a particular time period of the plurality of time periods based on the associated timestamp of each data record, and establishes, in step 1325, connection between clusters of different time periods of the plurality of time periods by also assigning each data record of each particular time period to both an adjacent preceding time period and succeeding time period.

In step 1330, the monitoring device detects one or more cluster transitions (e.g., preservation, splits, absorption, disappearance, emergence, size, and density) based on the established connections between clusters of different time periods. Also, as described in greater detail above, in step 1335, the monitoring device also computes one or more cluster migration metrics based on the cluster transitions (e.g., growth rate, change rate, novelty rate, and split rate).

As described above, in step 1340, the monitoring device may now predict future cluster migration metrics based on computed cluster migration metrics, and can detect, in step 1345, an anomaly about the predicted future cluster migration metrics. In step 1350, therefore, the monitoring device may react to the anomaly, such as by increasing a level of data record ingestion, performing one or more anomaly mitigation mechanisms, determining a level of the anomaly and reacting at a level corresponding to the level of the anomaly, and so on.

The simplified procedure 1300 may then end in step 1355, notably with the ability to continue ingesting and clustering data. Other steps may also be included generally within procedure 1300. For example, such steps (or, more generally, such additions to steps already specifically illustrated above), may include: sending anomalies and representative non-anomalous data records to a controller; applying domain-specific heuristics to one or both of clusters and time periods; using flexible distance metrics that adapt to changes in data stream structure when placing each data record of the plurality of data records into a corresponding cluster; reducing a level of the reacting in response to the anomaly no longer existing; and so on.

It should be noted that while certain steps within procedures 600 and 1300 may be optional as described above, the steps shown in FIGS. 6 and 13A-13B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600 and 1300 are described separately, certain steps from each procedure may be incorporated into each other procedure, and the procedures are not meant to be mutually exclusive.

The techniques described herein, therefore, provide for predictive data capture with adaptive control. In particular, the techniques herein define a new model of evolutionary clustering and cluster migration metrics to analyze cluster transitions for anomaly detection (near term, one step prediction, as well as both single cluster and aggregated anomaly detection). The zero-touch, unsupervised learning techniques herein (e.g., self-learning models) require no manual configuration for different event streams structures, addresses different types of cluster transitions for multiple use cases, do not require changes to algorithms when event structure/configuration changes, and can dynamically adjust to any environment and can be applied to multiple domains to detect anomalies and trigger remediation. Further, the use of separate edge and backend (e.g., controller) actions, including real-time anomaly detection and cross domain correlation for longer time periods, respectively, allows for optimized data storage and memory at both the edge, the backend, and the communication network therebetween.

In still further embodiments of the techniques herein, a business impact of the data captured can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the data captured with various business transactions in order to better understand the effect on the business transactions, accordingly.

Illustratively, the techniques described herein may be performed by hardware, software, and/or firmware, such as in accordance with the illustrative predictive and adaptive data capture process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may comprise: ingesting, by a monitoring device, a plurality of data records sequentially from a data stream, each of the plurality of data records having an associated timestamp; building, by the monitoring device, a cluster pattern for a plurality of time periods by placing each data record of the plurality of data records into a corresponding cluster of a particular time period of the plurality of time periods based on the associated timestamp of each data record; establishing, by the monitoring device, connection between clusters of different time periods of the plurality of time periods by also assigning each data record of each particular time period to both an adjacent preceding time period and succeeding time period; detecting, by the monitoring device, one or more cluster transitions based on the established connections between clusters of different time periods; computing, by the monitoring device, one or more cluster migration metrics based on the cluster transitions; predicting, by the monitoring device, future cluster evolution metrics based on computed cluster migration metrics; detecting, by the monitoring device, an anomaly about the predicted future cluster migration metrics; and reacting, by the monitoring device, to the anomaly.

In one embodiment, the data records comprise one or both of numeric metrics and non-numeric events, and the method further comprises tokenizing the non-numeric events prior to placing each data record of the plurality of data records into a corresponding cluster of a particular time period of the plurality of time periods. In one embodiment, reacting to the anomaly comprises increasing a level of data record ingestion. In one embodiment, reacting to the anomaly comprises one or more anomaly mitigation mechanisms. In one embodiment, the monitoring device is a controller, and wherein the data records comprise cross-domain cluster data. In one embodiment, the monitoring device is an edge device, and wherein the data records comprise local data. In one embodiment related to this, the method comprises sending anomalies and representative non-anomalous data records to a controller. In one embodiment, reacting to the anomaly comprises: determining a level of the anomaly; and reacting at a level corresponding to the level of the anomaly. In one embodiment, the method further comprises reducing a level of the reacting in response to the anomaly no longer existing. In one embodiment, the method further comprises using flexible distance metrics that adapt to changes in data stream structure when placing each data record of the plurality of data records into a corresponding cluster. In one embodiment, the method further comprises applying domain-specific heuristics to one or both of clusters and time periods. In one embodiment, the one or more cluster transitions are selected from a group consisting of: preservation; splits; absorption; disappearance; emergence; size; and density. In one embodiment, the one or more cluster migration metrics are selected from a group consisting of: growth rate; change rate; novelty rate; and split rate.

According to the embodiments herein, a tangible, non-transitory, computer-readable medium herein may have computer-executable instructions stored thereon that, when executed by a processor on a computer, may cause the computer to perform a method comprising: ingesting a plurality of data records sequentially from a data stream, each of the plurality of data records having an associated timestamp; building a cluster pattern for a plurality of time periods by placing each data record of the plurality of data records into a corresponding cluster of a particular time period of the plurality of time periods based on the associated timestamp of each data record; establishing connection between clusters of different time periods of the plurality of time periods by also assigning each data record of each particular time period to both an adjacent preceding time period and succeeding time period; detecting one or more cluster transitions based on the established connections between clusters of different time periods; computing one or more cluster migration metrics based on the cluster transitions; predicting future cluster evolution metrics based on computed cluster migration metrics; detecting an anomaly about the predicted future cluster migration metrics; and reacting to the anomaly.

Further, according to the embodiments herein an apparatus herein may comprise: one or more network interfaces to communicate with a network; a processor coupled to the network interfaces and configured to execute one or more processes; and a memory configured to store a process executable by the processor, the process, when executed, configured to: ingest a plurality of data records sequentially from a data stream, each of the plurality of data records having an associated timestamp; build a cluster pattern for a plurality of time periods by placing each data record of the plurality of data records into a corresponding cluster of a particular time period of the plurality of time periods based on the associated timestamp of each data record; establish connection between clusters of different time periods of the plurality of time periods by also assigning each data record of each particular time period to both an adjacent preceding time period and succeeding time period; detect one or more cluster transitions based on the established connections between clusters of different time periods; compute one or more cluster migration metrics based on the cluster transitions; predict future cluster migration metrics based on computed cluster migration metrics; detect an anomaly about the predicted future cluster migration metrics; and react to the anomaly.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
ingesting, by a monitoring device, a plurality of data records sequentially from a data stream, each of the plurality of data records having an associated timestamp;
building, by the monitoring device, a cluster pattern for a plurality of time periods by placing each data record of the plurality of data records into a cluster corresponding to a particular time period of the plurality of time periods based on the associated timestamp of each data record;
establishing, by the monitoring device, connection between clusters of different time periods of the plurality of time periods by also placing each data record of each particular time period into at least one other cluster corresponding to one or both of an adjacent preceding time period and a succeeding time period, such that at least one data record of a given time period is placed into a cluster corresponding to the given time period, a cluster corresponding to an adjacent time period preceding the given time period, and a cluster corresponding to an adjacent time period succeeding the given time period;
detecting, by the monitoring device, one or more cluster transitions based on the established connections between clusters of different time periods;
computing, by the monitoring device, one or more cluster migration metrics based on the cluster transitions;
predicting, by the monitoring device, future cluster evolution metrics based on computed cluster migration metrics;
detecting, by the monitoring device, an anomaly about the predicted future cluster migration metrics; and
reacting, by the monitoring device, to the anomaly.

2. The method as in claim 1, wherein the data records comprise one or both of numeric metrics and non-numeric events, the method further comprising:
tokenizing the non-numeric events prior to placing each data record of the plurality of data records into a corresponding cluster of a particular time period of the plurality of time periods.

3. The method as in claim 1, wherein reacting to the anomaly comprises increasing a level of data record ingestion.

4. The method as in claim 1, wherein reacting to the anomaly comprises one or more anomaly mitigation mechanisms.

5. The method as in claim 1, wherein the monitoring device is a controller, and wherein the data records comprise cross-domain cluster data.

6. The method as in claim 1, wherein the monitoring device is an edge device, and wherein the data records comprise local data.

7. The method as in claim 6, further comprising:
sending anomalies and representative non-anomalous data records to a controller.

8. The method as in claim 1, wherein reacting to the anomaly comprises:
determining a level of the anomaly; and
reacting at a level corresponding to the level of the anomaly.

9. The method as in claim 1, further comprising:
reducing a level of the reacting in response to the anomaly no longer existing.

10. The method as in claim 1, further comprising:
using flexible distance metrics that adapt to changes in data stream structure when placing each data record of the plurality of data records into a corresponding cluster.

11. The method as in claim 1, further comprising:
applying domain-specific heuristics to one or both of clusters and time periods.

12. The method as in claim 1, wherein the one or more cluster transitions are selected from a group consisting of: preservation; splits; absorption; disappearance; emergence; size; and density.

13. The method as in claim 1, wherein the one or more cluster migration metrics are selected from a group consisting of: growth rate; change rate; novelty rate; and split rate.

14. A tangible, non-transitory, computer-readable medium having computer-executable instructions stored thereon that, when executed by a processor on a computer, cause the computer to perform a method comprising:
ingesting a plurality of data records sequentially from a data stream, each of the plurality of data records having an associated timestamp;
building a cluster pattern for a plurality of time periods by placing each data record of the plurality of data records into a cluster corresponding to a particular time period of the plurality of time periods based on the associated timestamp of each data record;
establishing connection between clusters of different time periods of the plurality of time periods by also placing each data record of each particular time period into at least one other cluster corresponding to one or both of an adjacent preceding time period and a succeeding time period, such that at least one data record of a given time period is placed into a cluster corresponding to the given time period, a cluster corresponding to an adjacent time period preceding the given time period, and a cluster corresponding to an adjacent time period succeeding the given time period;
detecting one or more cluster transitions based on the established connections between clusters of different time periods;
computing one or more cluster migration metrics based on the cluster transitions;
predicting future cluster evolution metrics based on computed cluster migration metrics;
detecting an anomaly about the predicted future cluster migration metrics; and
reacting to the anomaly.

15. The computer-readable medium as in claim 14, wherein the data records comprise one or both of numeric metrics and non-numeric events, the method further comprising:

tokenizing the non-numeric events prior to placing each data record of the plurality of data records into a corresponding cluster of a particular time period of the plurality of time periods.

16. The computer-readable medium as in claim 14, wherein reacting to the anomaly comprises increasing a level of data record ingestion.

17. The computer-readable medium as in claim 14, wherein reacting to the anomaly comprises one or more anomaly mitigation mechanisms.

18. The computer-readable medium as in claim 14, wherein the computer is a controller, and wherein the data records comprise cross-domain cluster data.

19. The computer-readable medium as in claim 14, wherein the computer is an edge device, and wherein the data records comprise local data.

20. An apparatus, comprising:
one or more network interfaces to communicate with a network;
a processor coupled to the network interfaces and configured to execute one or more processes; and
a memory configured to store a process executable by the processor, the process, when executed, configured to:
ingest a plurality of data records sequentially from a data stream, each of the plurality of data records having an associated timestamp;
build a cluster pattern for a plurality of time periods by placing each data record of the plurality of data records into a cluster corresponding to a particular time period of the plurality of time periods based on the associated timestamp of each data record;
establish connection between clusters of different time periods of the plurality of time periods by also placing each data record of each particular time period into at least one other cluster corresponding to one or both of an adjacent preceding time period and a succeeding time period, such that at least one data record of a given time period is placed into a cluster corresponding to the given time period, a cluster corresponding to an adjacent time period preceding the given time period, and a cluster corresponding to an adjacent time period succeeding the given time period;
detect one or more cluster transitions based on the established connections between clusters of different time periods;
compute one or more cluster migration metrics based on the cluster transitions;
predict future cluster migration metrics based on computed cluster migration metrics;
detect an anomaly about the predicted future cluster migration metrics; and
react to the anomaly.

* * * * *